United States Patent
Jacob (10) Patent No.: US 7,563,422 B2
(45) Date of Patent: Jul. 21, 2009

(54) METHOD FOR REDUCING A PARTICLE AND NITROGEN OXIDE PROPORTION IN AN EXHAUST GAS FLOW OF AN INTERNAL COMBUSTION ENGINE AND CORRESPONDING EXHAUST GAS TREATMENT UNIT

(75) Inventor: Eberhard Jacob, Krailing (DE)

(73) Assignee: Emitec Gesellschaft Fuer Emissiontechnologie mbH, Lohmar (DE)

( * ) Notice: Subject to any disclaimer, the term of this patent is extended or adjusted under 35 U.S.C. 154(b) by 0 days.

(21) Appl. No.: 11/970,222

(22) Filed: Jan. 7, 2008

(65) Prior Publication Data

US 2008/0175776 A1    Jul. 24, 2008

Related U.S. Application Data

(63) Continuation of application No. PCT/EP2006/006397, filed on Jun. 30, 2006.

(30) Foreign Application Priority Data

Jul. 6, 2005    (DE) .................. 10 2005 031 816

(51) Int. Cl.
| | |
|---|---|
| B01D 46/00 | (2006.01) |
| B01D 53/56 | (2006.01) |
| B01D 53/92 | (2006.01) |
| B01D 53/94 | (2006.01) |
| F01N 3/10 | (2006.01) |

(52) U.S. Cl. ............... 423/213.2; 423/213.7; 423/215.5; 423/239.1; 60/274; 60/282; 60/299; 60/301; 60/302

(58) Field of Classification Search ............ 423/213.2, 423/213.7, 239.1; 60/274, 282, 299, 301, 60/302
See application file for complete search history.

(56) References Cited

U.S. PATENT DOCUMENTS 5,974,794 A    11/1999 Gotoh et al.
(Continued)

FOREIGN PATENT DOCUMENTS

DE    695 13 092 T2    2/2000
(Continued)

OTHER PUBLICATIONS

Chandler, G., et al., "Einflussfaktoren auf das Ansprechverhalten leichter Diesel Oxidationskatalysatoren" (English title: Factors affecting the Light-Off Performance of Light-Duty Diesel Oxidations Catalysts), article dated 2000, pp. 1063-1078, XP-001015125.

*Primary Examiner*—Timothy C Vanoy
(74) *Attorney, Agent, or Firm*—Laurence A. Greenberg; Werner H. Stemer; Ralph E. Locher (57) ABSTRACT

A method for reducing the particle and nitrogen oxide proportion in an exhaust gas flow of an internal combustion engine includes supplying a reducing agent to the exhaust gas flow, subjecting the exhaust gas flow containing the reducing agent to particle filtering, and then carrying out a selective catalytic reduction of at least a portion of the nitrogen oxides in the exhaust gas flow. The method and an exhaust gas treatment unit make it possible to simultaneously reduce the proportion of particles and nitrogen oxides in the exhaust gas. Ammonia, in particular, is used as the reducing agent. Regeneration of the particle filter is promoted by leading an ammonia-containing flow of gas through the particle filter. The method and device make it possible to consume less fuel with the same reaction rate and, at the same time to reduce available installation space, in comparison with existing corresponding prior art systems.

22 Claims, 6 Drawing Sheets

U.S. PATENT DOCUMENTS

| | | |
|---|---|---|
| 6,696,031 B1 | 2/2004 | Twigg et al. |
| 6,712,884 B2 | 3/2004 | Brück et al. |
| 6,823,660 B2 | 11/2004 | Minami |
| 6,892,529 B2 | 5/2005 | Duvinage et al. |
| 7,210,288 B2 * | 5/2007 | Bandl-Konrad et al. ....... 60/297 |
| 7,213,395 B2 * | 5/2007 | Hu et al. ....................... 60/286 |
| 7,254,939 B2 | 8/2007 | Duvinage et al. |
| 7,267,805 B2 | 9/2007 | Brück et al. |
| 7,361,320 B2 * | 4/2008 | Duvinage et al. ........ 423/213.2 |
| 7,434,387 B2 * | 10/2008 | Yan .............................. 60/286 |
| 2002/0011069 A1 | 1/2002 | Maus et al. |
| 2003/0180195 A1 | 9/2003 | Chapman et al. |
| 2004/0168905 A1 | 9/2004 | Duvinage et al. |
| 2006/0196169 A1 | 9/2006 | Ripper et al. |
| 2007/0125072 A1 * | 6/2007 | McCarthy et al. ............. 60/286 |
| 2007/0240402 A1 * | 10/2007 | Andreasson et al. ........... 60/274 |
| 2007/0289291 A1 * | 12/2007 | Rabinovich et al. ........... 60/286 |
| 2008/0006025 A1 * | 1/2008 | McCarthy .................... 60/286 |
| 2008/0256936 A1 * | 10/2008 | Zuberi ......................... 60/299 |

FOREIGN PATENT DOCUMENTS

| | | |
|---|---|---|
| DE | 101 28 414 A1 | 12/2002 |
| DE | 102 26 975 A1 | 1/2004 |
| DE | 102 43 270 A1 | 3/2004 |
| DE | 102 58 185 A1 | 7/2004 |
| DE | 698 17 649 T2 | 7/2004 |
| EP | 1 321 641 A1 | 6/2003 |
| EP | 1 338 770 A2 | 8/2003 |
| EP | 1 617 051 A1 | 1/2006 |
| WO | 00/42302 A1 | 7/2000 |
| WO | 00/74823 A1 | 12/2000 |
| WO | 01/92692 A1 | 12/2001 |
| WO | 02/00326 A2 | 1/2002 |
| WO | WO 2004/061278 A1 * | 7/2004 |
| WO | 2004/111401 A1 | 12/2004 |

* cited by examiner

METHOD FOR REDUCING A PARTICLE AND NITROGEN OXIDE PROPORTION IN AN EXHAUST GAS FLOW OF AN INTERNAL COMBUSTION ENGINE AND CORRESPONDING EXHAUST GAS TREATMENT UNIT

CROSS-REFERENCE TO RELATED APPLICATION

This is a continuing application, under 35 U.S.C. §120, of copending International Application No. PCT/EP2006/006397, filed Jun. 30, 2006, which designated the United States; this application also claims the priority, under 35 U.S.C. §119, of German Patent Application DE 10 2005 031 816.9, filed Jul. 6, 2005; the prior applications are herewith incorporated by reference in their entirety.

BACKGROUND OF THE INVENTION

Field of the Invention

The subject matter of the present invention is a method for the reduction of the particle and nitrogen oxide proportion in an exhaust gas flow of an internal combustion engine, and a corresponding exhaust gas treatment unit. The method according to the invention and the exhaust gas treatment unit according to the invention can preferably be used in the exhaust system of an automobile.

In internal combustion engines, fuels are converted in an oxidative fashion. In that case, in particular, hydrocarbon-containing fuels are converted to form corresponding combustion products. A plurality of exhaust gas components are generated therein, which are partially undesirable. Worldwide, many countries have regulations which limit the permissible output of undesirable exhaust gas components. In diesel engines in particular, particles and nitrogen oxide concentrations in the exhaust gas are generated which, in many countries, must be reduced in order to adhere to limit values.

The particles contained in the exhaust gas of an internal combustion engine often contain carbon. The particles are conventionally trapped in particle filters. There are both closed particle filter systems, such as for example ceramic extrudates which have alternately closed channels in such a way that exhaust gas, as it flows through the particle filter, must flow through a porous wall which is situated between two channels, with the particles being at least partially adhered to the wall, and open particle filter systems.

Open filter systems are described, for example, in International Publication No. WO 01/092692 A2 or International Publication No. WO 02/00326 A2, corresponding to U.S. Pat. No. 6,712,884. Those documents involve systems including channels which can be traversed by an exhaust gas and which have walls that are formed at least partially from, for example, an at least partially fluid-permeable component such as for example a fibrous layer or a corresponding porous sintered metal component. Further components are preferably provided, for example in a part of the walls which delimit the channels and which deflect an exhaust gas flow toward the porous channel walls. In that case, at least a part of the particles are separated at the porous walls through the use of pressure differences which conduct the exhaust gas flow at least partially through the porous wall.

The open systems are referred to as being open because, in contrast to closed systems, the exhaust gas flow which flows through the particle filter need not flow through any wall but may flow through the wall. That is to say, for the case in which all of the pores of the walls between two channels have already been blocked by particles, in the closed filter, flow can no longer pass through the channel. In the open filter, however, flow can pass through the channel in a situation of that type.

Nitrogen oxides are often converted through the use of a selective catalytic reduction to form molecular nitrogen. A selective catalytic reduction of that type often demands the use of a reducing agent which reacts selectively to nitrogen oxides. A reducing agent of that type is, for example, ammonia ($NH_3$).

The required reducing agents can, for example, be produced in the exhaust system from a reducing agent precursor, with the reducing agent precursor being a substance which can be converted into a reducing agent and/or from which the reducing agent can be separated. Preferred separation possibilities include a thermolysis, pyrolysis and/or hydrolysis of the reducing agent precursor, which can in each case be catalytically assisted. One possible reducing agent precursor of the reducing agent ammonia includes, for example, urea ($(NH_2)_2CO$). Further possible reducing agent precursors of the reducing agent ammonia are cyanuric acid or isocyanic acid, and ammonium carbamate.

Before the selective catalytic reduction is carried out, the reducing agent precursor must be treated in such a way that the reducing agent is generated or released. For example, the reducing agent precursor can be hydrolyzed or thermolyzed for that purpose. The reducing agent which is generated in that way is then mixed with the exhaust gas flow and leads, as it passes through a correspondingly-constructed SCR (Selective Catalytic Reduction) catalytic converter, to a conversion of the nitrogen oxide to form molecular nitrogen and water.

An article by R. Allansson, P. G. Blakeman, G. R. Chandler, C. A. Maloney, A. P. Walker, J. P. Warren and J. E. Thoss, entitled "Einsatz von selbstregenerierenden Partikelfiltersystemen (CRT) sowie SCRT zur Einhaltung künftiger Emissionsgrenzen" ["Use of Self-Regenerating Particle Filter Systems (CRT) and SCRT for Adhering to FUTURE EMISSION LIMITS"], in $21^{st}$ International Vienna Engine Symposium, H. P. Lenz (editor), VDI progress reports, Series 12, No. 420, Volume 2, pages 343-455, 2000, discloses a system which is composed of a particle filter and an SCR catalytic converter. The particle filter is formed upstream of the SCR catalytic converter and a urea solution is injected into the system between the particle filter and the SCR catalytic converter. The particle filter is a ceramic particle filter with alternately closed channels. The system has an increased exhaust gas back pressure in operation as a result of the SCR catalytic converter connected downstream.

International Publication No. WO 00/42302 A1, corresponding to U.S. Patent Application Publication No. US 2002/0011069 A1, in turn discloses a system in which a particle filter has a storage coating that can also absorb nitrogen oxides. The particle filter can be traversed by ammonia as a reducing agent. However, no selective catalytic reduction takes place therein, so that the conversion of nitrogen oxides can be improved.

Although conventional systems composed of an open particle filter, a subsequent apparatus for adding reducing agent and an SCR catalytic converter have better exhaust gas counterpressure values, the systems can, however, be further improved with respect to their particle conversion.

SUMMARY OF THE INVENTION

It is accordingly an object of the invention to provide a method for reducing a particle and nitrogen oxide proportion in an exhaust gas flow of an internal combustion engine and a corresponding exhaust gas treatment unit, which overcome the hereinafore-mentioned disadvantages of the heretofore-known methods and devices of this general type and which have higher conversion rates of nitrogen oxides and particles.

With the foregoing and other objects in view there is provided, in accordance with the invention, a method for reducing a particle and nitrogen oxide proportion in an exhaust gas flow of an internal combustion engine. The method comprises:

1.1) providing a reducing agent in the exhaust gas flow;
1.2) carrying out particle filtering of the exhaust gas flow including the reducing agent; and
1.3) then carrying out a selective catalytic reduction of at least a part of the nitrogen oxides ($NO_x$) in the exhaust gas flow.

In contrast to conventional systems known from the prior art, the reduction of a particle proportion on one hand and the reduction of the nitrogen oxide proportion on the other hand, are not considered separately. The two processes are in fact combined in such a way that when particle filtering takes place as per step 1.2), the exhaust gas flow already contains the reducing agent, as per step 1.1). This is advantageous, in particular, when ammonia ($NH_3$) is used for the selective catalytic reduction of nitrogen oxides ($NO_x$).

If the temperature during the particle filtering is less than approximately 200° C. then, in parallel to the separation of the particles, a non-catalytic reaction of nitrogen dioxide ($NO_2$) with ammonia ($NH_3$) takes place to form ammonium nitrate ($NH_4NO_3$), molecular nitrogen ($N_2$) and water ($H_2O$):

If the ammonium nitrate which is thus generated is heated above approximately 200° C., then the ammonium nitrate is dissociated to form ammonia and nitric acid ($HNO_3$):

Nitric acid is a strong oxidant for carbon in soot form and oxidizes soot according to the formula:

The reducing agent ammonia is therefore advantageously used for the continuous regeneration of the particle filter. In this case, the ammonia proportion in the exhaust gas flow is not reduced, so that the full ammonia proportion of the exhaust gas is available for the selective catalytic reduction of the nitrogen oxides in step 1.3) in a corresponding SCR catalytic converter. Ammonia in fact acts in this case as a reaction facilitator which promotes the disproportionation of nitrogen dioxide to form nitric acid and nitrogen. In this context, it can be advantageous to carry out an oxidation of nitrogen monoxide (NO) to form nitrogen dioxide ($NO_2$), for example at a correspondingly-constructed oxidation catalytic converter, before the particle filtering step 1.2) and if appropriate also before the addition of the reducing agent step 1.1). In this way, the relative proportion of nitrogen dioxide in the nitrogen oxides in the exhaust gas is continuously increased.

In addition, the method according to the invention advantageously utilizes the fact that, at temperatures greater than approximately 200° C., the oxidation of carbon through the use of nitrogen oxide is surprisingly not hindered by the presence of the reducing agent ammonia. The conversion of the carbon and therefore the regeneration of the particle filter in fact take place even further, being increased further by the chemisorption of ammonia on the carbon. The chemisorbed ammonia increases the reactivity of the carbon with respect to oxidants.

For this reason, the method according to the invention makes it possible to advantageously improve the regeneration of a particle filter at which the particle filtering step 1.2) takes place. Additional regeneration possibilities for the regeneration of the corresponding particle filter by converting the absorbed particles can be provided according to the invention. These include, in particular, the provision of measures which permit an at least brief heating of the particle filter above a temperature from which a reaction of the carbon, for example with residual oxygen, takes place.

The method according to the invention thus permits an improved particle conversion rate with a simultaneous reduction in the nitrogen oxide proportion in the exhaust gas.

In particular, a mixture of the exhaust gas with the reducing agent also takes place within the context of method step 1.2), as a result of which a strand formation of the reducing agent, which prevents the conversion of the $NO_x$ during the subsequent selective catalytic reduction, is completely or partially dissolved. One particular difficulty with the method in the embodiment of selective catalytic reduction of the NOx with (nitrogen-containing) reducing agents, is the requirement of a homogeneous distribution of the reducing agent in the exhaust gas flow upstream of the SCR catalytic converter. As homogeneous a distribution of the reducing agent as possible, which can be correspondingly produced according to the invention, advantageously permits as homogeneous a conversion of the nitrogen oxides as possible, and thereby increases the conversion rate of the nitrogen oxides in relation to conventional systems.

In accordance with another mode of the method of the invention, the particle filtering step 1.2) is carried out in a particle filter.

In this case, the particle filter can, on one hand, be a closed system in which at least one flow channel with porous walls is provided, with the flow channel being configured in such a way that it cannot be traversed continuously by exhaust gas, but rather the exhaust gas must in its entirety pass through the walls of the channel. This can take place, for example, in a structure with a plurality of flow channels in such a way that the channels are alternately closed off at the inlet and at the outlet side. On the other hand, an open particle filter system can be provided in which at least one continuous flow channel is formed. A continuous flow channel is to be understood within the context of the invention to mean, in particular, a channel which is not closed off and therefore through which not only gas can flow but which can fundamentally also be traversed by a solid particle that is not adhered in or on a wall. A filter having at least one continuous flow channel of this type can thus be referred to as a so-called open filter. Open filters have the advantage that, even in the event of a very intense loading of the filter with particles, an excessive rise in the counterpressure in the filter cannot occur, and that the filter thus virtually cannot become blocked. In permanent operation, this has considerable advantages over a closed system. An open system additionally has the advantage that the exhaust gas counterpressure does not rise to an excessive degree.

A method in which the exhaust gas that flows through the particle filter includes the reducing agent, is additionally preferable. The reducing agent can preferably promote the regeneration of the particle filter, that is to say the reaction of the embedded carbon. In accordance with a further mode of the method of the invention, the reducing agent advantageously includes a nitrogen-containing and hydrogen-containing compound, in particular ammonia.

The particle filter is, in particular, constructed in such a way that the best possible mixture of the exhaust gas with the reducing agent takes place, in particular through the use of a construction of the particle filter which permits a cross-flow of the exhaust gas from one channel into at least one adjacent channel. This can be permitted, for example, through the use of the formation of apertures in the channel walls.

In accordance with an added mode of the method of the invention, the reducing agent is at least partially generated on board from at least one gaseous starting material.

That is to say that the reducing agent is generated not from additional reserves, for example of a reducing agent precursor, which are carried on board a motor vehicle, but rather from gaseous starting materials. In accordance with an additional mode of the method of the invention, a gaseous starting material is to be understood, in particular, also to mean air and/or exhaust gas in arbitrary mixture ratios. The alternative or additional addition of nitrogen or oxygen is also possible.

In particular, the reducing agent or a precursor of the reducing agent can be generated, or its generation can be assisted, through the use of a thermal plasma. It is possible, in particular, for ammonia to be generated as described in German Published, Non-Prosecuted Patent Application DE 102 58 185 A1, corresponding to U.S. Patent Application Publication No. US 2004/0168905 A1. The content of the disclosure of that document, with regard to the generation of ammonia through the use of a plasma generator and a corresponding reduction catalytic converter in a secondary flow, and additionally, in particular, in connection with the corresponding structure of the plasma generator and the corresponding operation of the plasma generator, is included in its entirety by reference in the content of the disclosure of this application.

In accordance with yet another mode of the method of the invention, the reducing agent is generated on board at least partially from a reducing agent precursor.

In accordance with yet a further mode of the method of the invention, urea can particularly preferably be used as a reducing agent precursor. In this case, the urea can be added as a solid or else in the form of a urea-water solution. The reducing agent provision step 1.1) in this case also includes a pyrolysis, thermolysis and/or hydrolysis of the urea to form ammonia.

The on-board generation from gaseous starting materials and from entrained non-gaseous reducing agent precursors can preferably also be combined. It is thus possible to use the on-board generation of ammonia from gaseous starting materials to cover a certain base load for the conversion of nitrogen oxides, while the reducing agent generated from reducing agent precursors can serve for covering peaks in the nitrogen oxide concentration. If ammonia is used as a reducing agent, then the reducing agent precursor can be entrained, in particular, in the form of solid urea or a urea-water solution.

With the objects of the invention in view, there is also provided an exhaust gas treatment unit having a throughflow direction. The exhaust gas treatment unit comprises:
  9.1) an apparatus for adding reducing agent, for reducing nitrogen oxides ($NO_x$), into a gas flow flowing through the exhaust gas treatment unit;
  9.2) a particle filter; and
  9.3) a reduction catalytic converter for selective catalytic reduction of nitrogen oxides (NOx);
  the apparatus for adding reducing agent, the particle filter and the reduction catalytic converter being interconnected for conducting the gas flow through the apparatus for adding reducing agent, the particle filter and the reduction catalytic converter in succession in the throughflow direction.

The exhaust gas treatment unit can, in particular, implement the method according to the invention. The apparatus 9.1) for adding reducing agent is suitable for adding a reducing agent for the reduction of nitrogen oxides ($NO_x$) to a gas flow which flows through the exhaust gas treatment unit. According to the invention, the components 9.1), 9.2) and 9.3) are connected to one another in such a way that a gas flow can flow through the components 9.1), 9.2) and 9.3) in succession in the throughflow direction.

According to the invention, the particle filter 9.2) is traversed by reducing agent which can be added by or in the apparatus for adding reducing agent 9.1). In operation, a continuous regeneration of the particle filter 9.2) through the use of the reducing agent can thus advantageously be promoted. This is the case, in particular, when ammonia ($NH_3$) is used as reducing agent. The above-specified reactions take place there. In addition, due to the chemisorption of ammonia on the carbon, there is additionally further improved regeneration of the particle filter. In particular when the particle filter 9.2) and the reduction catalytic converter 9.3) are combined in one component, considerably less installation space, in particular in motor vehicles, is required than if each of the two components were of individual construction.

The particle filter 9.2) can, in particular, be constructed in such a way that a gas which flows through it is mixed. In operation, it is thus possible for a reducing-agent-containing exhaust gas which flows through the particle filter 9.2) to be homogenized to the greatest possible extent in order to thereby permit as uniform as possible a conversion of the nitrogen oxides in the reduction catalytic converter 9.3). If, instead of a method according to the invention, for example a particle filter which is provided with a corresponding SCR coating is traversed by the reducing-agent-containing exhaust gas, then the nitrogen dioxide required for the regeneration of the particle filter would already be converted in the starting region of the particle filter by the SCR coating, so that the nitrogen dioxide would no longer be available downstream for the regeneration. The method according to the invention is also advantageous for this reason.

In accordance with another feature of the invention, the apparatus for adding reducing agent 9.1) includes an introduction device for a reducing agent precursor and a pyrolysis, thermolysis and/or hydrolysis unit.

In this case, preferably urea, ammonium carbamate, isocyanic acid and/or cyanuric acid can be used as reducing agent precursors. The use of urea, in particular as solid urea or in the form of an aqueous solution, is particularly preferable in this case.

In particular, a correspondingly coated catalyst carrier body which has a coating that promotes the hydrolysis of the reducing agent precursor, can be used as a hydrolysis unit. The thermolysis or pyrolysis unit can obtain the correspondingly required heat, in particular, from the exhaust gas itself, with a thermolysis of the reducing agent precursor thus taking place in such a way that the exhaust gas heats the reducing agent precursor to a temperature above a corresponding thermolysis temperature. It is also possible for further thermolysis units to alternatively or additionally be used, which can, for example, also include a heatable structure such as an electrically heatable honeycomb body.

In accordance with a further feature of the exhaust gas treatment unit of the invention, the apparatus 9.1) for adding reducing agent includes a reducing agent generator which is suitable for generating reducing agent from at least one gaseous starting material in the exhaust gas treatment unit.

Such an on-board generation of reducing agent, such as, in particular, of ammonia, can preferably be carried out through the use of a system having a correspondingly constructed and operable plasma generator. With regard to a corresponding ammonia generator which includes a plasma generator, reference is made to German Published, Non-Prosecuted Patent Application DE 102 58 185 A1, corresponding to U.S. Patent Application Publication No. US 2004/0168905 A1, the content of the disclosure of which, in particular in connection with the structure and the operation of the plasma generator, the structure of the electrodes and the structure in the secondary line, is included by reference in the content of the disclosure of this application.

In accordance with an added feature of the exhaust gas treatment unit of the invention, ammonia, in particular, can be used as reducing agent.

In accordance with an additional feature of the exhaust gas treatment unit of the invention, an oxidation catalytic converter is particularly preferable connected downstream of the reducing agent catalytic converter 9.3). It is possible, in particular, for a honeycomb body to be formed which, in a front partial region, includes a reduction catalytic converter coating at the beginning of the reduction catalytic converter 9.3) and, in a rear region, includes an oxidation catalytic converter coating. The downstream oxidation catalytic converter serves, in particular, as a blocking catalytic converter which oxidizes, in particular, a breakthrough in the reducing agent, in particular ammonia, and therefore effectively prevents the discharge of ammonia into the atmosphere.

In accordance with yet another feature of the exhaust gas treatment unit of the invention, preferably the particle filter 9.2) and the reduction catalytic converter 9.3) are formed in one component. For this purpose, a correspondingly constructed honeycomb body can be provided which has a reduction catalytic converter coating in a downstream region. The integration of a downstream oxidation catalytic converter on the same carrier is additionally advantageously possible and within the scope of the invention.

In accordance with yet a further feature of the exhaust gas treatment unit of the invention, the particle filter 9.2) includes at least one continuous flow channel.

A continuous flow channel is to be understood herein, in particular, to mean a channel which is not closed off. It is thus possible not only for a gas to flow through a channel of this type, but the channel can fundamentally also be traversed by a solid particle without the latter becoming embedded in a porous wall. It is possible, in particular, for a continuous flow channel to be traversed by a gas without it being necessary for the gas to pass through one of the walls. A continuous flow channel therefore has a geometric flow cross section which does not become zero over the entire length of the flow channel. A filter having at least one such continuous flow channel is referred to, in particular, as an open filter.

In accordance with yet an added feature of the exhaust gas treatment unit of the invention, the particle filter 9.2) includes at least one metallic layer. It is particularly preferable in this connection that the particle filter 9.2) includes at least one at least partially porous metallic layer and at least one layer which is embodied at least partially as a sheet metal layer.

An embodiment in which a honeycomb body is constructed from substantially smooth and at least partially structured layers, is particularly preferable in this case. According to one preferred embodiment, the substantially smooth layers are formed from an at least partially fluid-permeable material. It is possible, in particular, for a first region of the layers to be formed from an at least partially permeable material, while a second region, which adjoins the first region in the longitudinal direction, is formed from a non-fluid-permeable material such as, for example, a thin metal sheet. The at least partially structured layers can, for example, include corrugated sheet metal foils. An at least partially fluid-permeable layer or a correspondingly at least partially fluid-permeable material are to be understood to mean, in particular, fibrous materials, and in this case, woven and non-woven fibrous materials, and porous sintered metal elements which can be produced through the use of sintering of, for example, particles and/or fibers. It is thus possible to produce a honeycomb body which, in a first region, includes a particle filter and, in a second region, includes an SCR catalytic converter. In this case, the smooth layers are preferably formed, in the filter region, from porous material which is particularly preferably not coated, while the SCR catalytic converter regions of the smooth layers are formed from a correspondingly coated sheet metal foil. A corresponding structuring which leads to an exhaust gas that flows through the body being deflected toward the smooth porous layers, is provided in the first region of the corrugated layers, so as to be situated opposite the porous material of the smooth layers. In this case, it is also possible for apertures and corresponding guide structures to be provided which bring about a corresponding local deflection of the flow. In the SCR catalytic converter region of the structured layers, it is also possible, in particular, to form microstructures with a structure amplitude which is smaller than the fundamental structure amplitude of the at least partially structured layers. In particular, it is possible in this region for apertures to be formed in both layer types, that is to say both in the at least partially structured layers as well as in the substantially smooth layers, in particular also apertures having dimensions which are greater than the structure repeating lengths of the at least partially structured layers in the region. So-called cavities are thus also formed in addition to the already-existing channels. The cavities constitute spaces into which the exhaust gas can flow from a plurality of channels and out of which the exhaust gas can flow into a plurality of channels. Turbulence of the flow particularly advantageously occurs in the cavities. A transverse distribution of the gas flow can take place in the cavities, and the contact of the substances to be converted with the catalytically coated surface is improved, since a mixture and turbulence of the gas flow which flows through the body takes place. That part of the body which can serve as a reduction catalytic converter 9.3) can also finally include a corresponding oxidation catalytic converter coating as a blocking catalytic converter for preventing the breakthrough of ammonia.

In accordance with yet an additional feature of the exhaust gas treatment unit of the invention, the particle filter 9.2) and/or the reduction catalytic converter 9.3) is formed:
  by winding at least one at least partially structured layer and if appropriate at least one substantially smooth layer, or
  by stacking at least one at least partially structured and if appropriate at least one substantially smooth layer and twisting at least one stack.

In this context, an at least partially structured layer is to be understood as a layer which has been placed from a planar shape into such a structure that the structures, in interaction with a substantially smooth or at least partially structured layer of some other type or identical type, form continuous structures, for example channels of an eventual carrier body. A structuring of a layer is, in particular, not understood to mean a winding or twisting of the layer. An at least partially structured layer is to be understood to mean a layer which includes a corresponding structuring at least in partial regions. A substantially smooth layer is to be understood to mean a layer which can include a structuring, with the structuring, however, being considerably smaller with regard to its amplitude than the structures of the at least partially structured layer. Such so-called microstructures can, in particular, run not in the direction of the extent of the channels but rather at an angle with respect thereto, so that the microstructures promote improved mixture of a gas which flows through the body, and in particular also prevent the formation of laminar boundary flows.

A layer is to be understood herein, in particular, to mean a metallic layer, preferably a sheet metal foil, a fibrous mat, a porous sintered layer and combinations of at least two of the elements. A combination of the elements is to be understood, in particular, to also mean a layer which is composed, for example, of a porous material, such as for example a fibrous layer or a corresponding sintered material, in a first longitudinal region, and of a sheet metal foil in a second longitudinal region, in which the porous material and sheet metal foil are connected to one another through the use of technical joining, in particular a resistance welding or brazing. The twisting of the stack can take place in the same direction or opposite direction. The bodies described herein can, in particular, preferably be used for constructing an open filter.

In accordance with a concomitant feature of the exhaust gas treatment unit of the invention, a second oxidation catalytic converter is formed upstream of the particle filter 9.2) in the throughflow direction. The second oxidation catalytic converter can serve, in particular, for the oxidation of nitrogen monoxide (NO) to form nitrogen dioxide ($NO_2$) and can therefore increase the relative concentration of the nitrogen dioxide in the nitrogen oxides. The nitrogen dioxide can advantageously be used in the context, for example, of a CRT (Continuous Regeneration Trap) process. In particular, the above-explained reactions can take place there.

A system of this type has the advantage that it is not necessary, as is known from discontinuous regeneration processes known from the prior art, either for a further reagent to be entrained or for fuel to be used for heating the particle filter. The fuel consumption is therefore reduced in comparison with systems of that type.

In addition, it is possible to use the methods and devices known from the prior art as an apparatus for adding reducing agent 9.1), in particular an addition of a reducing agent precursor and its subsequent breakdown or conversion to form a reducing agent or else an on-board generation of the reducing agent, such as for example as described above on the basis of a plasma generator. A reducing agent precursor is to be understood herein, in particular, to mean a substance which can react to form reducing agent or which can release reducing agent. The separation of the reducing agent can, for example, take place thermolytically or hydrolytically. Urea is preferably used as a reducing agent precursor. The urea can thermolytically and/or hydrolytically release ammonia as a reducing agent. Urea is added, in particular, in the form of solid particles and/or in the form of an aqueous urea solution. In this case, step 1.1) of the method according to the invention or the corresponding apparatus 9.1) for adding reducing agent includes a device for the hydrolysis and/or thermolysis of the urea at least partially to form ammonia. Further reducing agent precursors are preferably ammonium carbamate, isocyanic acid and cyanuric acid.

The details and advantages disclosed above in connection with the method according to the invention can be applied and transferred to an exhaust gas treatment unit according to the invention. This applies also to details disclosed within the context of the exhaust gas treatment unit according to the invention, which details can in the same way be applied and transferred to the method according to the invention.

Other features which are considered as characteristic for the invention are set forth in the appended claims.

Although the invention is illustrated and described herein as embodied in a method for reducing a particle and nitrogen oxide proportion in an exhaust gas flow of an internal combustion engine and a corresponding exhaust gas treatment unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
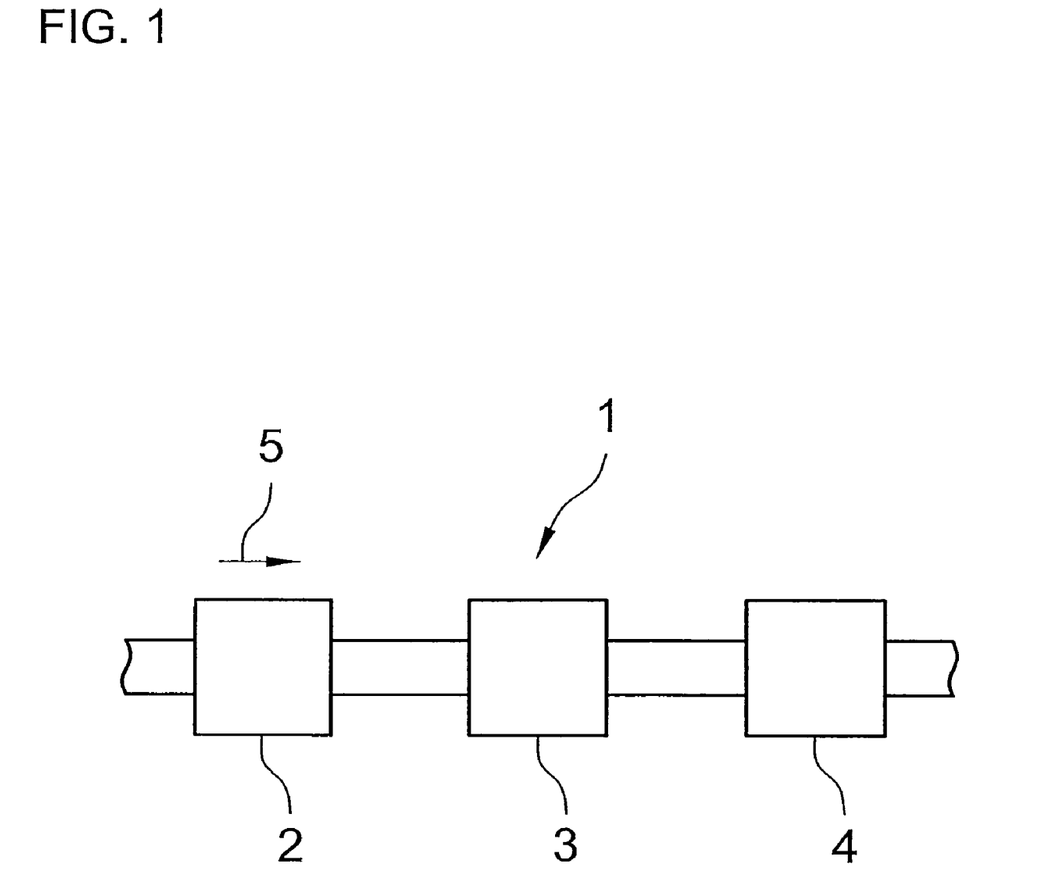
FIG. 1 is a block diagram of a first exemplary embodiment of a device according to the invention.

Referring now to the figures of the drawings in detail and first, particularly, to FIG. 1 thereof, there is seen an exhaust gas treatment unit 1 which includes an apparatus 2 for adding reducing agent, a particle filter 3 and a reduction catalytic converter 4 for the reduction of nitrogen oxides ($NO_x$) through the use of the SCR (selective catalytic reduction) method. The exhaust gas treatment unit 1 has a preferred throughflow direction 5. The apparatus 2 for adding reducing agent, the particle filter 3 and the reduction catalytic converter 4 are embodied as separate components in FIG. 1, but can also be formed at least partially together in a single component. This applies, in particular, to a combination of the particle filter 3 and the reduction catalytic converter 4. According to the invention, the apparatus 2 for adding reducing agent, the particle filter 3 and the reduction catalytic converter 4 are connected to one another in such a way that a gas flow in the throughflow direction 5 can flow firstly through the apparatus 2 for adding reducing agent, then through the particle filter 3 and then through the reduction catalytic converter 4. The configuration according to the invention ensures, in particular, that the particle filter 3 can be traversed by reducing-agent-containing gas. In operation, the exhaust gas treatment unit 1 is disposed in such a way that the exhaust gas leaving an internal combustion engine flows firstly through the apparatus 2 for adding reducing agent.

The apparatus 2 for adding reducing agent can, for example, be a device with which a reducing agent, preferably ammonia ($NH_3$) is generated in the exhaust gas flow from a reducing agent precursor such as, for example, urea. For this purpose, the apparatus 2 for adding reducing agent has a correspondingly constructed non-illustrated device with which, on one hand, a reducing agent precursor can be added and, on the other hand, the separation or generation of reducing agent from the reducing agent precursor can be ensured. It is, for example, possible in this case for urea as a reducing agent precursor to be added in solid form, and it is possible for a thermolysis and/or hydrolysis of the urea to take place at a corresponding hydrolysis catalytic converter. The urea can also take the form of an aqueous urea solution directly at a hydrolysis catalytic converter.

The reducing agent, preferably a nitrogen-containing and hydrogen-containing reagent, particularly preferably ammonia, can additionally be generated on board, directly in the exhaust gas treatment unit 1, from at least one gaseous starting material. For this purpose, the apparatus for adding reducing agent can, for example, include a plasma generator in a secondary flow. Through the use of the plasma generator, a gas flow, in particular a nitrogen-monoxide-containing gas flow, is generated in the secondary flow, with the nitrogen oxides of the gas flow being chemisorbed on a honeycomb body with a reduction storage coating, and stored as nitrites or nitrates. A reaction with the nitrites and nitrates to form ammonia can thereupon take place with a hydrogen-containing gas flow.

The particle filter 3 is provided downstream of the apparatus 2 for adding reducing agent, as seen in the throughflow direction 5. The particle filter can, in particular, be embodied as an open particle filter 2 which has at least one continuous flow passage, channel or duct.

Figure 2:
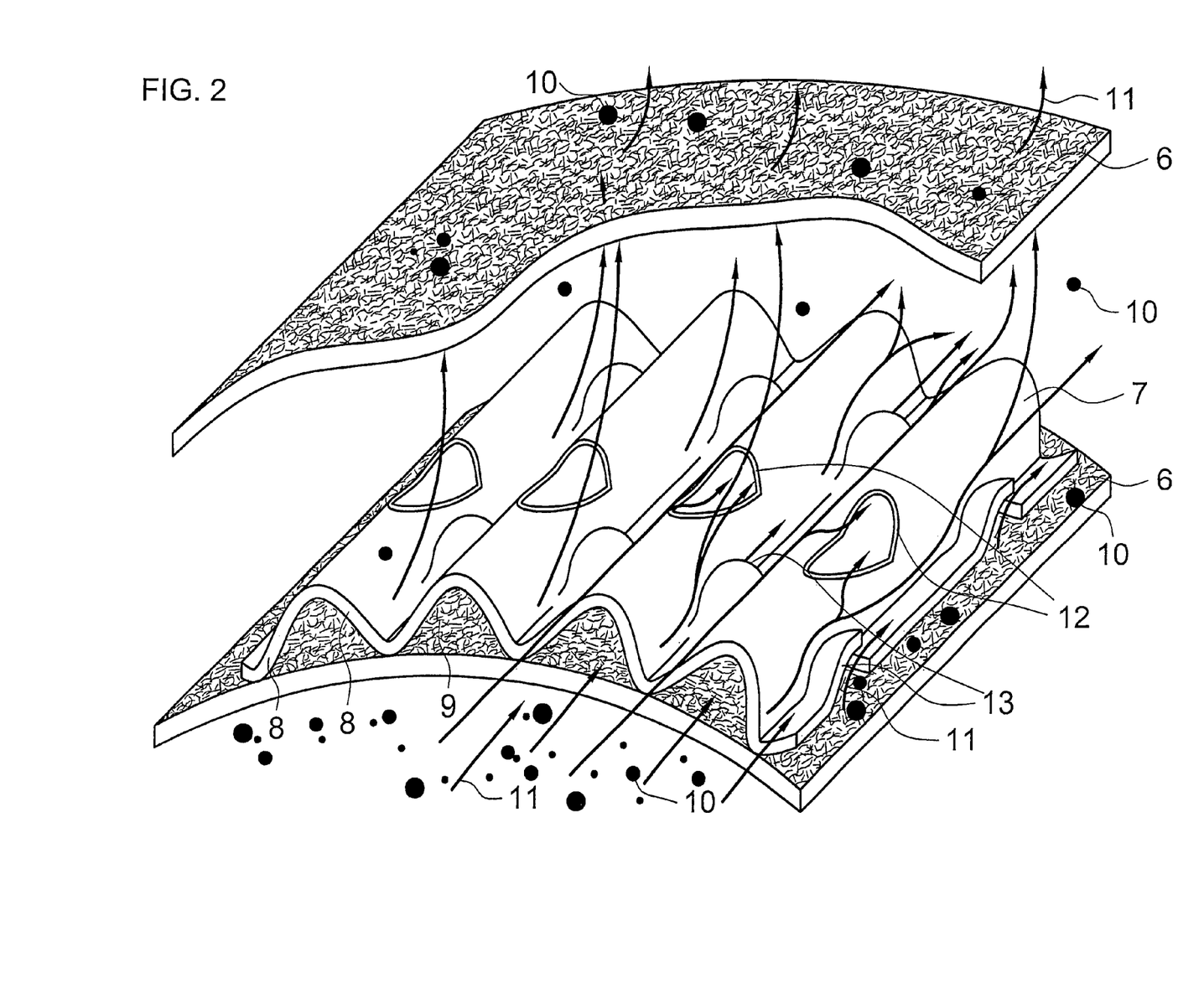
FIG. 2 is a fragmentary, diagrammatic, perspective view of a particle filter.

The particle filter 3 can, in particular, include a correspondingly-constructed honeycomb body. A structure which, as shown in FIG. 2, is constructed from at least partially fluid-permeable, substantially smooth layers 6 and at least partially structured layers 7, is preferred in this case. FIG. 2 diagrammatically shows a portion of a corresponding particle filter 3. The particle filter 3 is constructed by winding at least one at least partially fluid-permeable, substantially smooth layer 6 and at least one at least partially structured layer 7, or by stacking the layers 6, 7 of that type and subsequent twisting at least one stack of that type. Structures 8 of the at least partially structured layer 7, together with the at least partially fluid-permeable, substantially smooth layer 6, define flow channels 9 through which fluid can flow. The flow channels 9 are continuous, that is to say the cross section of the channels is not fully blocked at any point of the particle filter 3. An exhaust gas flow 11, which is laden with particles 10, flows through the particle filter 3. The exhaust gas flow 11 is deflected towards the at least partially fluid-permeable, substantially smooth layer 6 through the use of apertures 12 and guide blades 13 in the at least partially structured layer 7. In this case, at least a portion of the particles 10 becomes embedded in the at least partially fluid-permeable material 6. The structures of the apertures 12 and the guide blades 13 lead to a pressure gradient through the at least partially fluid-permeable, substantially smooth layer 6. The pressure gradient causes the exhaust gas flow 11 to pass through that layer.

An at least partially fluid-permeable layer is understood to mean an at least partially metallic layer which is porous at least in partial regions. This can, in particular, involve metallic fibrous layers which are woven or non-woven, or correspondingly formed metallic sintered layers in which a porosity is obtained through the use of corresponding sintering of powder or fibers. The at least partially structured layer 7 can, in particular, also be produced from a thin sheet metal foil.

The apertures 12 and guide blades 13 permit a deflection of the exhaust gas flow 11 from one flow channel 9 into an adjacent flow channel 9. This also leads, in particular, to a mixture of the exhaust gas which flows through the particle filter 3 and therefore to as homogeneous a distribution of the reducing agent in the exhaust gas as possible.

Figure 3:
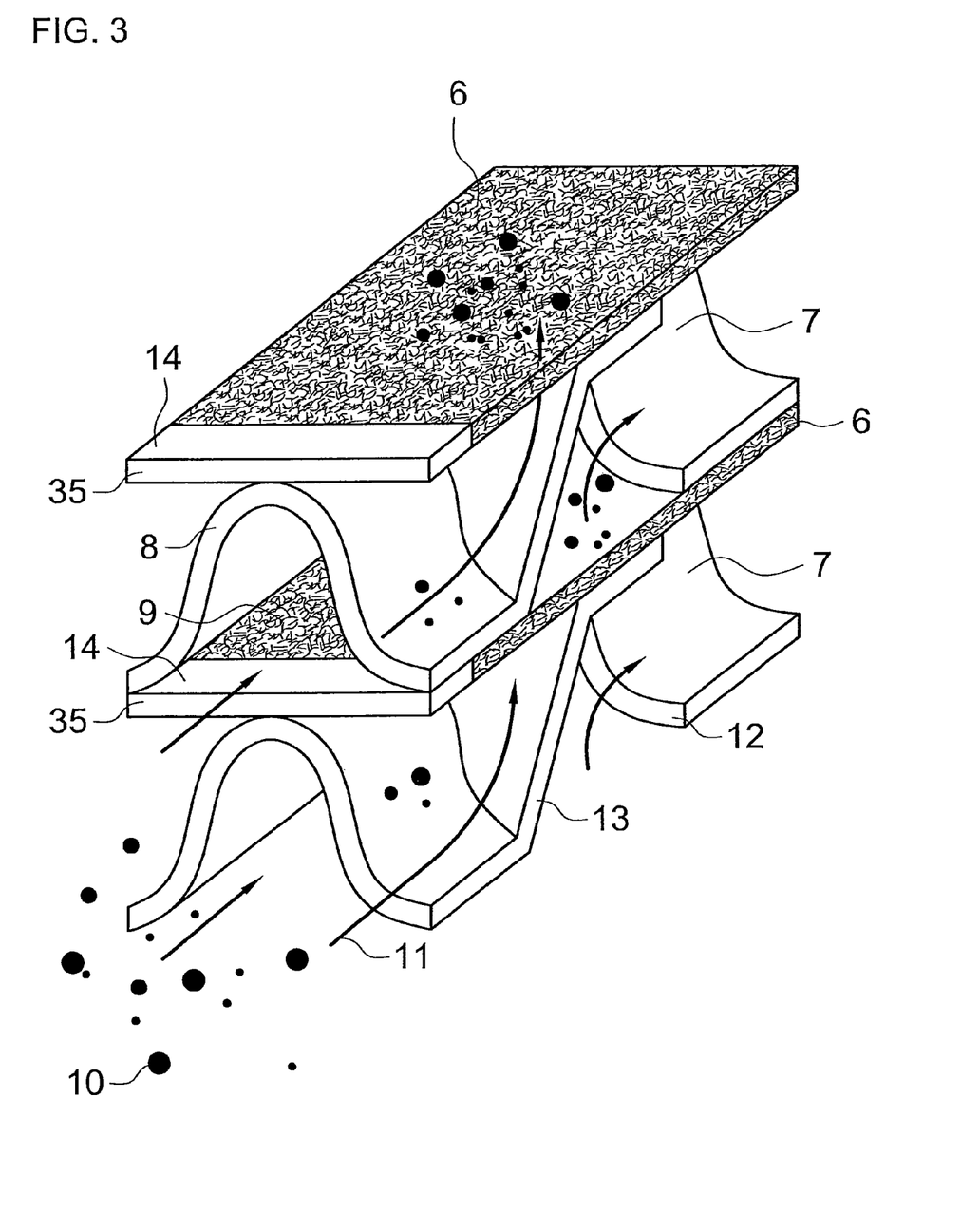
FIG. 3 is a fragmentary, perspective view of a portion of a particle filter.

FIG. 3 diagrammatically shows a further example of a particle filter 3. The exhaust gas flows 11 are deflected through the use of the guide blades 13 and the apertures 12 toward the at least partially fluid-permeable, substantially smooth layer 6. The apertures 12 and the guide blades 13 are formed in the at least partially structured layers 7. The at least partially structured layers 7 have substantially corrugated structures 8 which, together with the substantially smooth layer 6, form flow channels 9 through which fluid can flow. The at least partially fluid-permeable, substantially smooth layer 6 has a reinforcement region 14 at an approaching flow side. The reinforcement region 14 is preferably formed from a sheet metal foil which is attached to the at least partially fluid-permeable, substantially smooth layer 6 or engages around a corresponding part of the at least partially fluid-permeable, substantially smooth layer 6. The connection can be obtained, in particular, through the use of technical joining, for example through the use of corresponding welding, preferably resistance welding, or through the use of brazed or hard soldered connections. The reinforcement region 14 can advantageously prevent fraying of the edges of the at least partially fluid-permeable, substantially smooth layers which results from the pulsing of the exhaust gas flow 11. The reinforcement region 14 can advantageously be provided with a catalytically active coating, in particular in such a way that the reinforcement region 14 forms a second oxidation catalytic converter 35 which catalyzes the oxidation of nitrogen monoxide to form nitrogen dioxide. Nitrogen dioxide is an oxidant for carbon so that, through the use of the second oxidation catalytic converter 35, which can be formed on a separate honeycomb body situated downstream of the particle filter 3, the regeneration of the particle filter 3 is promoted through the use of intensified oxidation of the carbon in the particles.

The apertures 12 and the guide blades 13 additionally lead, in particular, to as homogeneous a distribution as possible of the reducing agent in the exhaust gas flow 11 which flows through the particle filter 3.

As can be seen from FIG. 1, a reduction catalytic converter 4 is formed downstream of the particle filter 3 in the throughflow direction 5. The reduction catalytic converter 4 is constructed and, in particular, coated in such a way that a selective catalytic reduction of nitrogen oxides ($NO$, $NO_2$) to form molecular nitrogen can take place. The reduction catalytic converter 4 is preferably a honeycomb body which includes fluid-permeable cavities. The honeycomb body can, in particular, be a ceramic monolith which is, for example, correspondingly extruded in the conventional manner. The honeycomb body can additionally be composed of substantially smooth and at least partially structured metallic layers, for example by virtue of an at least partially structured layer and a substantially smooth metallic layer being wound together or by virtue of stacks of at least one at least partially structured metallic layer and, if appropriate, at least one substantially smooth layer being stacked and at least one of the stacks being twisted to form a honeycomb body. The reduction catalytic converter 4 includes a coating which catalyzes the selective reduction of nitrogen oxides. It is possible, in particular, for a titanium-dioxide-(anatase)-supported vanadium-tungsten mixed oxide coating to be provided or a coating including metal-exchanged zeolite. The latter can, in particular, involve iron zeolite. The metal-exchanged zeolite preferably involves zeolites of the X, Y, ZSM-5 or ZSM-11 types.

Figure 4:
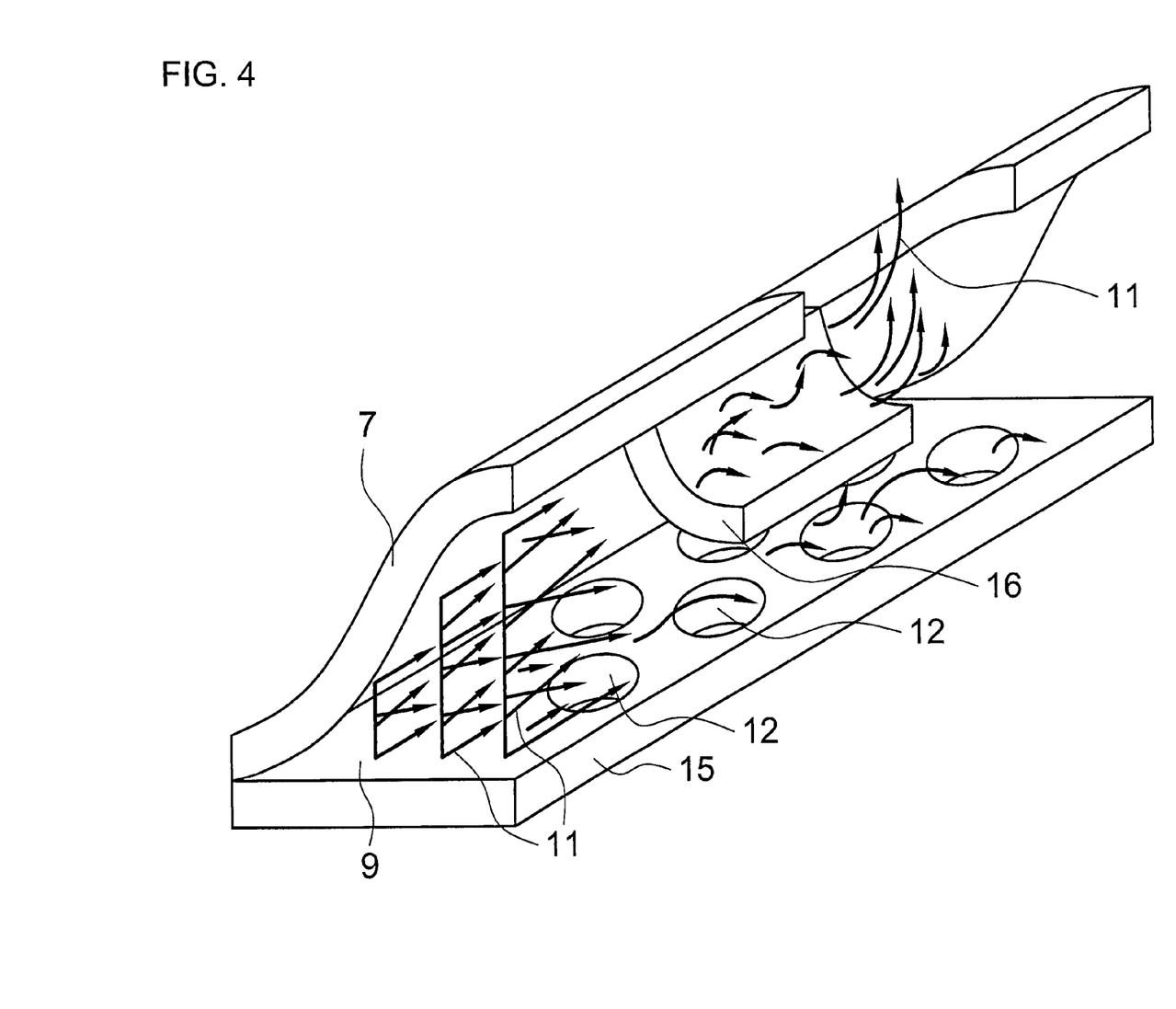
FIG. 4 is a fragmentary, perspective view of a portion of a reduction catalytic converter.

FIG. 4 shows a portion of an example of a possible reduction catalytic converter 4. The reduction catalytic converter 4 includes a honeycomb body which has substantially smooth layers 15 and at least partially structured layers 7. An exhaust gas flow in a flow channel 9 is indicated by arrows 11. The substantially smooth layer 15 has apertures 12 formed as recesses in the smooth layer without projecting regions. The perforated, substantially smooth layer 15 is situated opposite an at least partially structured layer 7 which has notches 16. A good mixture of the exhaust gas flows 11 is obtained through the use of the interaction of the apertures 12 and the notches 16. The mixture, in interaction with a non-illustrated coating formed on the layers 7, 15, leads to a good conversion of the nitrogen oxides. The apertures 12 and notches 16 can also result in an exchange of exhaust gas between adjacent channels.

FIGS. 2 to 4 illustrate preferred embodiments. However, the particle filter 3 and the reduction catalytic converter 4 can also have other structures.

Figure 5:
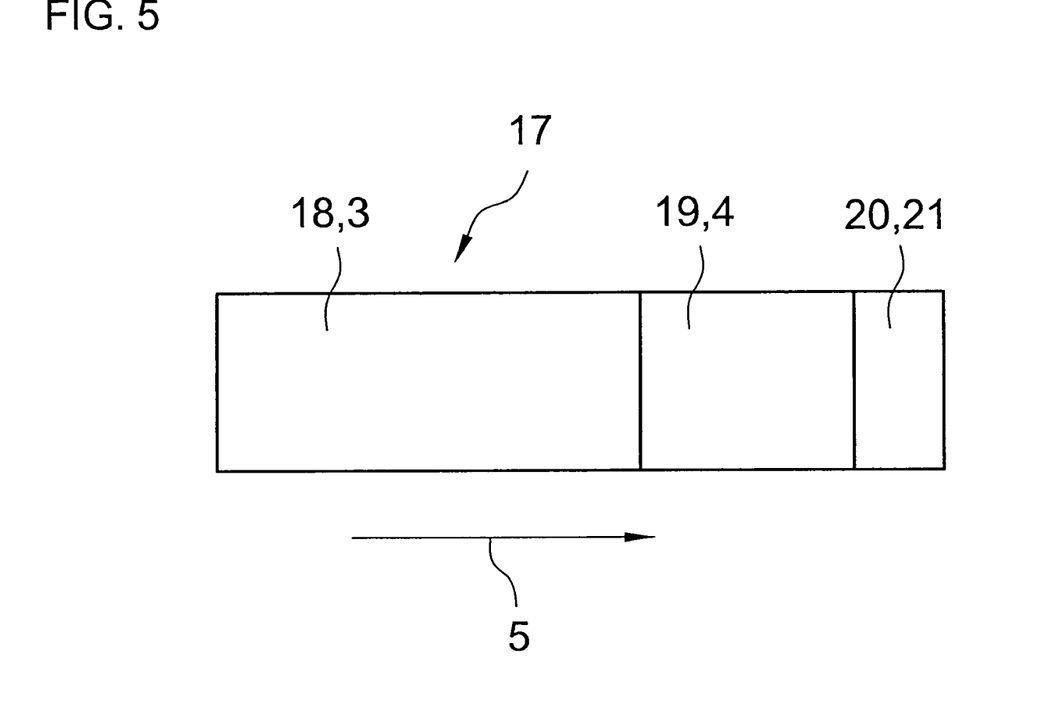
FIG. 5 is a block diagram of a component including a particle filter, a reduction catalytic converter and an oxidation catalytic converter.

FIG. 5 diagrammatically shows a component 17. The component 17 is a carrier body. The component 17 is constructed in such a way that, in the present exemplary embodiment, it includes three regions in the throughflow direction 5. A first region 18 in the throughflow direction 5 includes a particle filter 3. The particle filter 3 preferably has an open structure and particularly preferably as shown in detail in FIG. 3 or 4. A second region 19, which is formed so as to adjoin the first region 18 in the throughflow direction 5, serves as a reduction catalytic converter 4. This region is constructed, in particular, as shown in FIG. 4. A third region 20, which is optionally formed so as to adjoin the second region 19 in the throughflow direction 5, includes an oxidation catalytic converter 21. The component 17 is preferably formed from at least partially structured layers 7 and substantially smooth layers 6, 15. The respective layers 6, 7, 15 then have, in particular, the regions corresponding to the examples shown above. Those regions, after the formation of the component 17, correspond to the regions 18, 19, 20. It is thus, for example, possible for a structured layer to be formed which, in the partial region that corresponds to the first region 18, has structures 8, is uncoated and has apertures 12 and guide structures 13, while the structured layer, in the partial region which corresponds to the second region 19, is coated and has notches 16. It is correspondingly possible for a substantially smooth layer 6, in a region which corresponds to the first region 18, to be formed from a fluid-permeable material 6 and to be uncoated, while in a partial region which corresponds to the second partial region 19, the substantially smooth layer 6 is formed from a correspondingly formed sheet metal foil, in particular with apertures 12. In such a case, the smooth layer can be uncoated in the first region 18 while a corresponding coating is formed in the second region 19.

Figure 6:
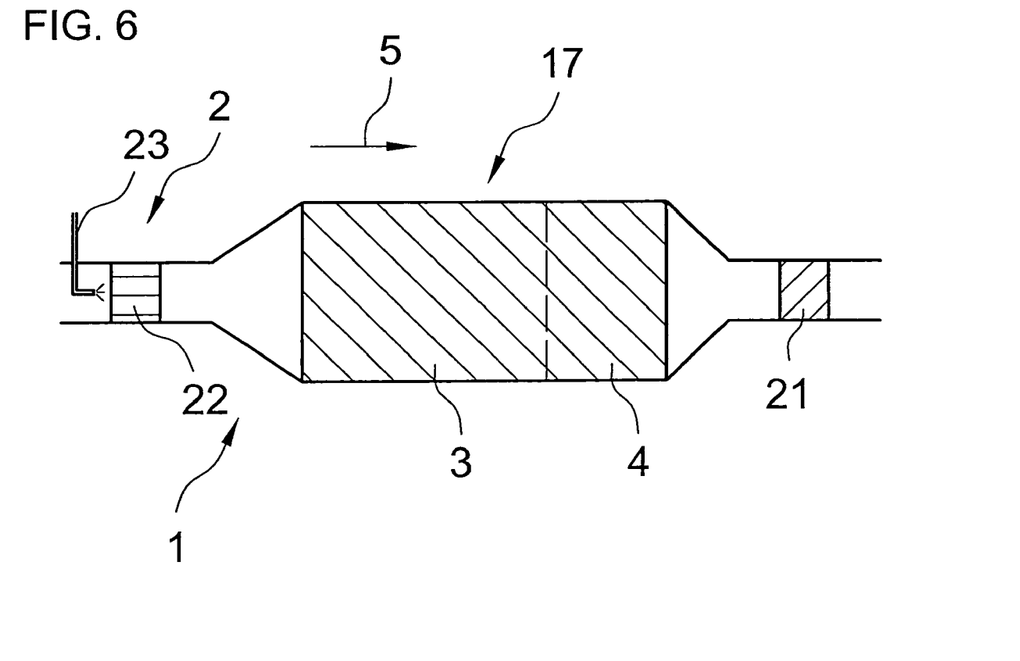
FIG. 6 is a fragmentary, elevational view of a second exemplary embodiment of the present invention.

As is shown in FIG. 6, according to the invention, a component 17 of this type can advantageously be formed together with a corresponding apparatus 2 for adding reducing agent.

FIG. 6 diagrammatically shows an exhaust gas treatment unit 1 including an apparatus 2 for adding reducing agent. The apparatus 2 for adding reducing agent includes a hydrolysis catalytic converter 22 and an introduction device 23 through which a reducing agent precursor can be added upstream of the hydrolysis catalytic converter 22 in the throughflow direction 5. In operation of the exhaust gas treatment unit 1, after the "light-off" temperature of the hydrolysis catalytic converter 22 is reached, a hydrolysis of the reducing agent precursor takes place. Urea is preferably used as the reducing agent precursor. The urea can be added through the use of the introduction device 23 in the form of a urea-water solution or in the form of a solid. In this case, a thermolysis and/or hydrolysis of the urea takes place at the hydrolysis catalytic converter 22. In this case, the urea $((NH_2)_2CO)$ is converted with water $(H_2O)$ to form ammonia $(NH_3)$ and carbon dioxide $(CO_2)$. The water required for this purpose is often contained as a by-product in the exhaust gas of internal combustion engines. The exhaust gas flow which leaves the hydrolysis catalytic converter 22 therefore contains reducing agent, preferably ammonia. The exhaust gas flow which is laden with ammonia then flows firstly through the particle filter 3 which is part of the component 17. In this case, as described above, an improved conversion of the soot particles takes place through the use of the ammonia which is present. It is preferably possible for an oxidation catalytic converter to be formed upstream of the apparatus 2 for adding reducing agent. Nitrogen monoxide is converted into nitrogen dioxide through the use of the oxidation catalytic converter. In the particle filter 3, the carbon-including particles which are contained in the exhaust gas are accumulated on corresponding filter elements, preferably as described above on porous or highly porous wall regions of flow channels 9.

After flowing through the particle filter 3, the exhaust gas flow which, as before, contains ammonia, flows through the reduction catalytic converter 4 which is likewise a region of the component 17. In this case, a selective catalytic reduction of the nitrogen oxides $(NO_x)$ contained in the exhaust gas with the reducing agent takes place to form molecular nitrogen and water, for example as follows:

$$NO+NO_2+2NH_3 \rightarrow 2N_2+3H_2O$$

In the exemplary embodiment according to FIG. 6, the oxidation catalytic converter 21 is not part of the component 17 but rather is connected downstream of the latter. A separate oxidation catalytic converter 21 is provided for this purpose.

Figure 7:
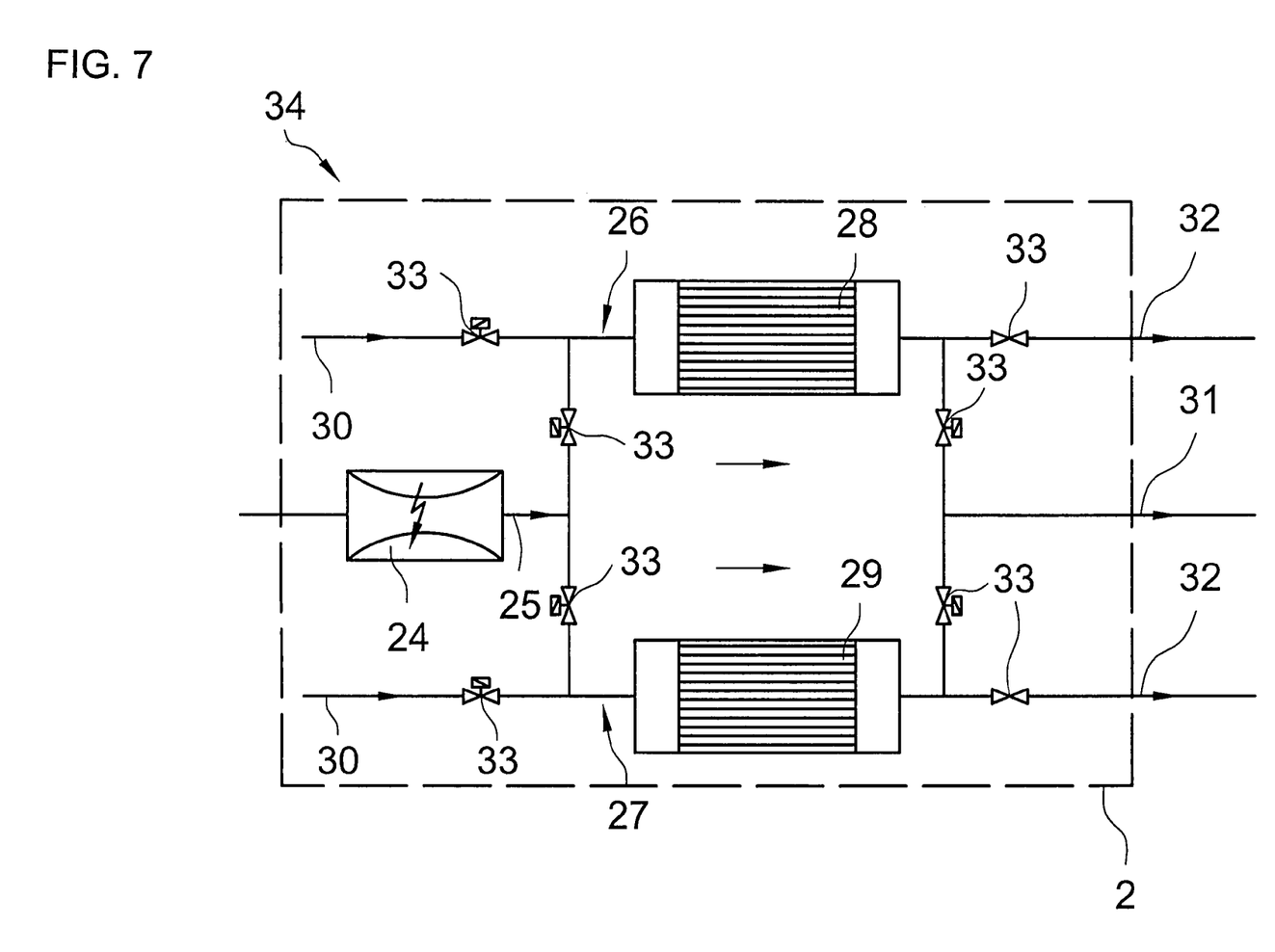
FIG. 7 is a schematic diagram of an example of an apparatus for adding reducing agent.

FIG. 7 diagrammatically shows a further exemplary embodiment of an apparatus 2 for adding reducing agent. The apparatus 2 for adding reducing agent includes a reducing agent generator 34. The reducing agent generator 34 includes a plasma generator 24. The plasma generator 24 is operated with a nitrogen-containing and oxygen-containing gas flow as an operating gas. The plasma generator 24 is, in particular, constructed and operated as described in German Published, Non-Prosecuted Patent Application DE 102 58 185 A1, corresponding to U.S. Patent Application Publication No. US 2004/0168905 A1, the content of the disclosure of which with regard to the structure of the plasma generator and the operation of the plasma generator is included by reference in the content of the disclosure of the instant application.

A nitrogen-monoxide-containing gas flow 25 leaves the plasma generator 24. A first gas line 26 and a second gas line 27 are provided so as to adjoin the latter. The gas lines 26, 27 can be traversed alternately by flow. The first gas line 26 includes a first storage reduction element 28 while the second gas line 27 includes a second storage reduction element 29. Each of the storage reduction elements 28, 29 is constructed in such a way, in particular by being provided with such a coating, that a chemisorption of nitrogen oxides, preferably of nitrogen monoxide, is possible. In this case storage takes place in the form of nitrites and nitrates. If a storage reduction element 28, 29 which is laden with nitrites and nitrates is now traversed by a hydrogen-containing gas flow, then the hydrogen reduces the nitrites and nitrates to form ammonia. It is thereby possible for an ammonia-containing gas flow to be provided. A hydrogen-containing gas flow 30 can be conducted through the storage reduction elements 28, 29 for the purpose of providing an ammonia-containing gas flow of this type. A hydrogen-containing gas flow 30 can, in particular, include a cracked gas or synthesis gas which is produced through the use of a reformer from fuel and/or hydrocarbons. This takes place, in particular, through the use of partial oxidation.

In operation of the apparatus 2 for adding reducing agent, the nitrogen-monoxide-containing gas 25 flows through either the first gas line 26 or the second gas line 27. If the nitrogen-monoxide-containing gas flow 25 flows through the first gas line 26, a chemisorption of the nitrogen oxides included in the nitrogen-monoxide-containing gas flow 25 takes place in the first storage reduction element 28. At the same time, the second gas line 27 is traversed by a hydrogen-containing gas 30, so that the nitrites and nitrates react to form ammonia in the at least partially filled second storage reduction element 29. An ammonia-containing gas flow 31 is therefore generated in each case at the same time, while at the same time, in each case in the other gas line, a generally oxygen-containing exhaust gas flow 32 is generated which is discharged.

The ammonia-containing gas flow 31 is then supplied according to the invention to the particle filter 3 and later to the reduction catalytic converter 4 as reducing agent. The waste gas flows 32 can, if appropriate, still be conducted through an oxidation catalytic converter into the exhaust line. The deflection of the respective gas flows takes place through the use of valves 33 which are correspondingly controlled and/or regulated.

The method according to the invention and the exhaust gas treatment device according to the invention advantageously permit the simultaneous reduction of the proportion of particles and nitrogen oxides in the exhaust gas. Ammonia, in particular, is used as a reducing agent. The regeneration of the particle filter 3 is advantageously promoted as a result of an ammonia-containing gas flow being conducted through the particle filter 3. The method according to the invention and the device according to the invention make it possible to get by with a lower additional fuel consumption, and at the same time to reduce the available installation space, in comparison with corresponding systems known from the prior art, while attaining the same conversion rate.

The invention claimed is:

1. A method for reducing a particle and nitrogen oxide proportion in an exhaust gas flow of an internal combustion engine, the method comprising the following steps:
   1.1) providing a reducing agent in the exhaust gas flow;
   1.2) carrying out particle filtering of the exhaust gas flow including the reducing agent;
   1.3) then carrying out a selective catalytic reduction of at least a part of the nitrogen oxides in the exhaust gas flow; and
   1.4) then carrying out oxidation in an oxidation catalytic converter.

2. The method according to claim 1, which further comprises carrying out the particle filtering step 1.2) in a particle filter.

3. The method according to claim 1, wherein the reducing agent includes a nitrogen-containing and hydrogen-containing compound.

4. The method according to claim 3, wherein the reducing agent includes ammonia.

5. The method according to claim 1, which further comprises at least partially generating the reducing agent on board from at least one gaseous starting material.

6. The method according to claim 5, which further comprises using, as the stating material, at least one gas selected from the group consisting of:
   6.1) oxygen;
   6.2) nitrogen;
   6.3) air; and
   6.4) exhaust gas.

7. The method according to claim 1, which further comprises generating the reducing agent on board at least partially from a reducing agent precursor.

8. The method according to claim 7, which further comprises using urea as a reducing agent precursor.

9. An exhaust gas treatment unit having a throughflow direction, the exhaust gas treatment unit comprising:
   9.1) an apparatus for adding reducing agent, for reducing nitrogen oxides ($NO_x$), into a gas flow flowing through the exhaust gas treatment unit;
   9.2) a particle filter;
   9.3) a reduction catalytic converter for selective catalytic reduction of nitrogen oxides ($NO_x$);
   said apparatus for adding reducing agent, said particle filter and said reduction catalytic converter being interconnected for conducting the gas flow through said apparatus for adding reducing agent, said particle filter and said reduction catalytic converter in succession in the throughflow direction; and
   9.4) an oxidation catalytic converter connected downstream of said reduction catalytic converter.

10. The exhaust gas treatment unit according to claim 9, wherein said apparatus for adding reducing agent includes an introduction device for a reducing agent precursor and a unit for at least one of pyrolysis, thermolysis or hydrolysis.

11. The exhaust gas treatment unit according to claim 9, wherein said apparatus for adding reducing agent includes a reducing agent generator for generating reducing agent from at least one gaseous starting material in the exhaust gas treatment unit.

12. The exhaust gas treatment unit according to claim 9, wherein the reducing agent is ammonia.

13. The exhaust gas treatment unit according to claim 9, wherein said particle filter includes at least one continuous flow channel.

14. The exhaust gas treatment unit according to claim 9, wherein said particle filter includes at least one metallic layer.

15. The exhaust gas treatment unit according to claim 14, wherein said particle filter includes at least one at least partially porous metallic layer and at least one layer constructed at least partially as a sheet metal layer.

16. The exhaust gas treatment unit according to claim 14, wherein at least one of said particle filter or said reduction catalytic converter includes at least one wound at least partially structured layer.

17. The exhaust gas treatment unit according to claim 14, wherein at least one of said particle filter or said reduction catalytic converter includes at least one at least partially structured layer and at least one substantially smooth layer wound together.

18. The exhaust gas treatment unit according to claim 14, wherein at least one of said particle filter or said reduction catalytic converter includes at least one stacked and twisted at least partially structured layer.

19. The exhaust gas treatment unit according to claim 14, wherein at least one of said particle filter or said reduction catalytic converter includes at least one at least partially structured layer and at least one substantially smooth layer stacked and twisted together.

20. The exhaust gas treatment unit according to claim 9, which further comprises an oxidation catalytic converter, disposed upstream of said particle filter in the throughflow direction, for oxidation of nitrogen monoxide (NO) to form nitrogen dioxide ($NO_2$).

21. A method for reducing a particle and nitrogen oxide proportion in an exhaust gas flow of an internal combustion engine, the method comprising the following steps:
  1.1) providing a reducing agent in the exhaust gas flow;
  1.2) carrying out particle filtering of the exhaust gas flow including the reducing agent;
  1.3) then carrying out a selective catalytic reduction of at least a part of the nitrogen oxides in the exhaust gas flow; and
  1.4) carrying out the particle filtering and the selective catalytic reduction in one component.

22. An exhaust gas treatment unit having a throughflow direction, the exhaust gas treatment unit comprising:
  9.1) an apparatus for adding reducing agent, for reducing nitrogen oxides ($NO_x$), into a gas flow flowing through the exhaust gas treatment unit;
  9.2) a particle filter; and
  9.3) a reduction catalytic converter for selective catalytic reduction of nitrogen oxides ($NO_x$);
  said apparatus for adding reducing agent, said particle filter and said reduction catalytic converter being interconnected for conducting the gas flow through said apparatus for adding reducing agent, said particle filter and said reduction catalytic converter in succession in the throughflow direction; and
  said particle filter and said reduction catalytic converter being formed in one component.

* * * * *